United States Patent
Rosenberg

[11] Patent Number: 5,950,676
[45] Date of Patent: Sep. 14, 1999

[54] EXPANSIBLE BELLOWS AND PULSATOR DEVICE INCLUDING SAME

[75] Inventor: Peretz Rosenberg, Moshav Beit Shearim, Israel

[73] Assignee: Super Disc Filters Ltd, Natania, Israel

[21] Appl. No.: 08/746,510

[22] Filed: Nov. 12, 1996

[30] Foreign Application Priority Data

Nov. 13, 1995 [IL] Israel ......................................... 115969

[51] Int. Cl.⁶ ............................. F16K 51/00; F01B 19/02
[52] U.S. Cl. ....................... 137/624.14; 138/30; 285/225; 92/34; 92/37
[58] Field of Search ............................... 137/624.14, 593; 138/30; 285/225, 229; 92/34, 37

[56] References Cited

U.S. PATENT DOCUMENTS

| | | | |
|---|---|---|---|
| 1,190,716 | 7/1916 | Bowmann | 285/225 X |
| 2,185,023 | 12/1939 | Crane | 138/30 |
| 2,481,472 | 9/1949 | Culp | 285/225 |
| 3,061,039 | 10/1962 | Peters | 138/30 X |
| 4,301,967 | 11/1981 | Hunter | 137/624.14 X |
| 4,781,217 | 11/1988 | Rosenberg | 137/624.14 |
| 5,201,342 | 4/1993 | Rosenberg | 137/624.14 |
| 5,314,116 | 5/1994 | Krauth et al. | 239/99 |

FOREIGN PATENT DOCUMENTS

| | | | |
|---|---|---|---|
| 12830 | 3/1855 | France | 285/225 |
| 737253 | 12/1932 | France | 285/225 |
| 14137 | 9/1892 | United Kingdom | 285/229 |
| 2129891 | 5/1984 | United Kingdom . | |

*Primary Examiner*—John Rivell
*Attorney, Agent, or Firm*—Benjamin J. Barish

[57] ABSTRACT

An expansible bellows, includes a pair of end plates attached together and sealed around their peripheries such that their inner faces confront each other to define between them an expansible chamber for containing a fluid. One end plate is formed with an inlet port to the chamber; and the other end plate is formed with an outlet port from the chamber. The inner and outer faces of both end plates are formed with recesses which permit the center portions of the end plates to flex outwardly, and thereby to expand the chamber, when pressurized fluid is inletted into the chamber via the inlet port and blocked from flowing out of the chamber through the outlet port.

Also described is a pulsator including such a bellows serving as the expansible chamber of the pulsator.

19 Claims, 3 Drawing Sheets

EXPANSIBLE BELLOWS AND PULSATOR DEVICE INCLUDING SAME

FIELD AND BACKGROUND OF THE INVENTION

The present invention relates to an expansible bellows, and also to a pulsator device including such a bellows. The invention is particularly useful in the pulse-irrigation method and apparatus described in my prior U.S. Pat. Nos. 4,781,217, 4,949,747, and 5,201,342, and is therefore described below with respect to such an application, although it will be appreciated that the novel expansible bellows, and also the pulsator device including such a bellows, may be used in many other applications.

U.S. Pat. No. 4,781,217 discloses a pulse-irrigation method and apparatus including an expansible chamber having a flow reducer connected to an inlet port of the chamber to produce a continuous slow flow of water into the chamber, and a valve assembly connected to the outlet port of the expansible chamber. The valve assembly is normally closed, automatically opens when the water in the chamber reaches a predetermined pressure, and automatically recloses when the water in the chamber drops to a second predetermined pressure lower than the first predetermined pressure to thereby produce an output in the form of high-pressure water pulses. Such an apparatus is useful for many agricultural applications, e.g., for reducing the water output of sprinklers or of drippers, and also in many non-agricultural applications, e.g., for operating pneumatic or hydraulic power drivers or the like.

The above-cited patent discloses various types of expansible chambers that may be used in the pulsator device, including a resilient tube, a pressurized container, or a vertical tube.

A bellows is another form of expansible chamber which is expansible in the axial direction. It is generally formed in one continuous operation from a thin seamless tube into a deeply folded or corrugated seamless unit. Such constructions, however, are generally quite bulky particularly if they are designed to accommodate high pressures.

OBJECTS AND SUMMARY OF THE INVENTION

An object of the present invention is to provide a novel expansible bellows construction which is particularly useful as the expansible chamber in the pulsator of the above-cited patent, but which may also be used in many other applications. Another object of the invention is to provide a pulsator including the novel expansible bellows.

According to one aspect of the present invention, there is provided an expansible bellows, comprising: a pair of end plates attached together and sealed around their peripheries such that their inner faces confront each other to define between them a chamber for containing a fluid; one of the end plates including an inlet port to the chamber; the other of the end plates including an outlet port from the chamber; the faces of both the end plates being formed with annular recesses which permit the center portions of the end plates to flex outwardly, and thereby to expand the chamber, when pressurized fluid is inletted into the chamber via the inlet port and blocked from flowing out of the chamber through the outlet port. Each end plate is integrally formed on one face with a plurality of pins spaced circumferentially around its outer periphery, and on the opposite face with a plurality of sockets arranged to receive, with a force-fit, the pins of the other end plate in order to permit the two end plates to be attached together at their outer preipheries.

According to further features in the described preferred embodiment, the recesses in both faces of the end plates are in the form of a plurality of concentric circles of different diameters so as to be radially spaced from each other. The circular recesses in the inner face of each end plate are aligned with the spaces between the circular recesses on the outer face of the respective end plate and the circular recesses in the inner face of each end plate are aligned with the circular recesses in the inner face of the other end plate.

Particularly goods results have been obtained when each of the end plates is formed of substantially rigid material and is of circular shape.

Such an expansible bellows provides a very compact structure capable of very high pressures, permits the bellows to be constructed according to any desired size, and also enables a plurality of bellows to be assembled as modular units in any desired number and/or sizes for any desired application. These features of the novel bellows make them particularly suitable for use in pulsating devices, such as in the pulse-irrigation method and apparatus of the above-cited patents, but also for many other non-agricultural applications.

According to another aspect of the present invention, therefore, there is provided a pulsator including an expansible bellows as described above, a flow reducer device connected to the inlet port of the bellows to produce a continuous slow flow of fluid into the chamber of the bellows; and a valve assembly connected to the outlet port; the valve assembly being normally closed, automatically opening when the fluid in the chamber has reached a predetermined pressure, and automatically reclosing when the fluid in the chamber has dropped to a second predetermined pressure lower than the first predetermined pressure.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
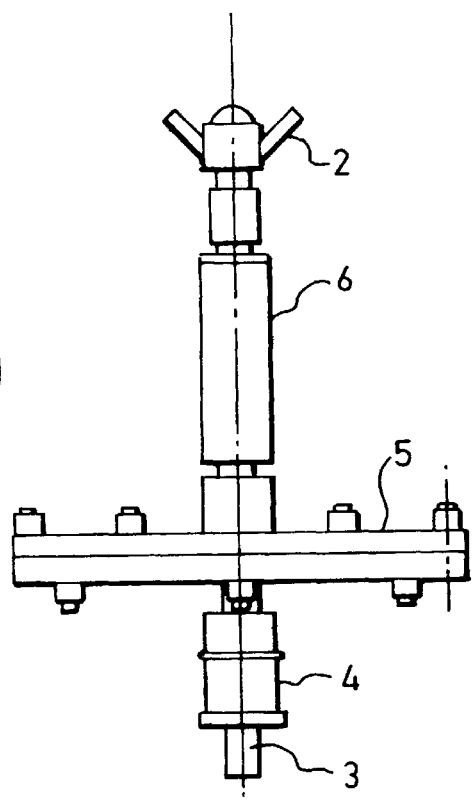
FIG. 1 illustrates one form of pulsator device including an expansible bellows constructed in accordance with the present invention, the bellows being shown in its normal condition.
Figure 2:
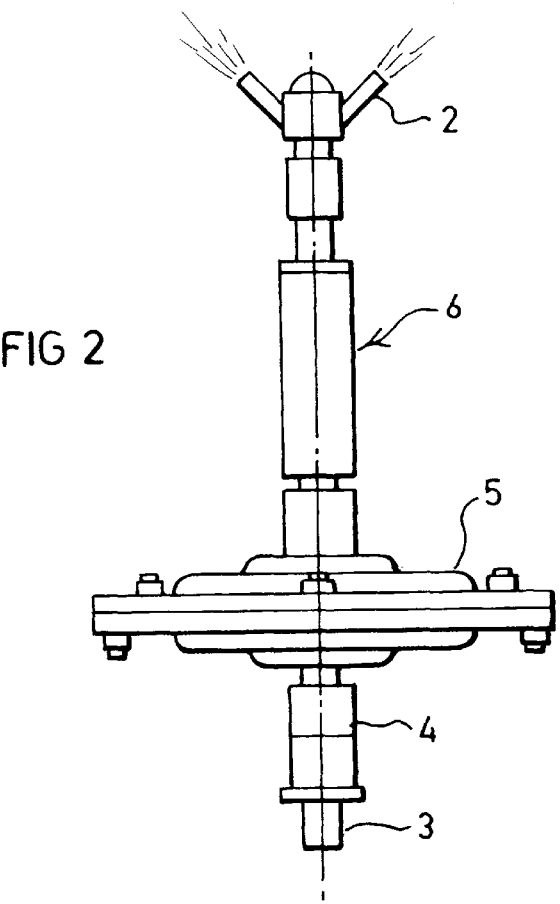
FIG. 2 illustrates the device of FIG. 1 with the bellows in its expanded condition.
Figure 3:
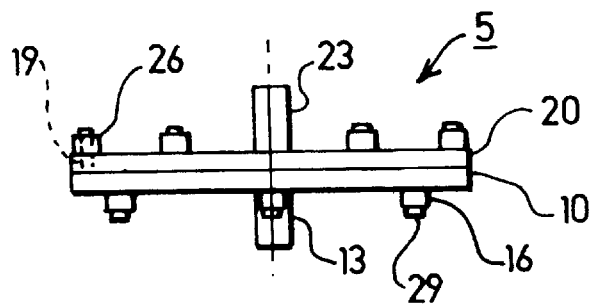
FIGS. 3 and 4 are side elevational views illustrating the bellows of FIGS. 1 and 2 in its normal and expanded conditions, respectively.

The pulsator device illustrated in FIGS. 1 and 2 is for use with a water sprinkler 2 which periodically discharges pulses of water supplied via an inlet 3. Thus, the sprinkler illustrated in FIGS. 1 and 2 includes a flow reducer device 4 connected to the water supply line 3, an expansible chamber in the form of a bellows 5 constructed in accordance with the present invention, and a valve assembly 6 between the bellows 5 and the water sprinkler 2. As described in the above-cited patents (e.g., U.S. Pat. No. 4,781,217), flow reducer device 4 produce a continuous slow flow of the water into the expansible chamber defined by bellows 5, and valve assembly 6 is normally closed to block the water from flowing out of the bellows, so that the water within it gradually builds up in pressure while its chmaber expands. Valve assembly 6 automatically opens to produce a water discharge when the water in the expansible chamber has reached a first predetermined pressure, and automatically recloses when the water in that chamber has dropped to a second predetermined pressure lower than the first predetermined pressure, thereby producing a pulsating discharge of the water from the sprinkler.

The flow reducer 4 may be any known type of flow reducer device, such as used in drip irrigation emitters.

Valve assembly 6 may be any assembly which operates as described above. One example of such a valve asembly is that described in U.S. Pat. No. 4,781,217.

The expansible chamber, however, is defined by bellows 5 constructed in accordance with the present invention and more particularly illustrated in FIGS. 3–7.

Bellows 5 includes two circular end plates or discs, 10 and 20, respectively, which are attached together and sealed around their outer peripheries such that the inner faces confront each other and define between them the expansible chamber for the water. Thus, as shown particularly in FIG. 7, circular end plate 10 includes an outer face 11 and an inner face 12, shown in FIGS. 5 and 6, respectively. The outer face 11 (FIG. 5) is formed with a central inlet port 13, constituted of a connector sleeve having a passageway extending therethrough to the inner face 12. Outer face 11 is further formed with a flat outer margin 14 and a plurality of concentric recesses 15a–15c decreasing in diameter inwardly from margin 14. Margin 14 is further formed with a plurality of sockets 16 spaced around its circumference integrally formed with the end plate to project outwardly of its outer face 11.

The inner face 12 of end plate 10 is also formed with a flat outer margin 17 and two concentric circular recesses 18a, 18b aligned with the spaces between the three concentric circular recesses 15a–15c formed on the outer face 11. Inner face 12 is integrally formed with a plurality of pins 19 spaced circumferentially around the flat margin 17 and projecting in the axial direction.

The other end plate 20 is of similar construction as end plate 10, including an outer face 21 and an inner face 22. The outer face 21 is formed with a central outlet port 23, a flat peripheral margin 24, three concentric circular recesses 25a–25c, and a plurality of sockets 26 spaced circumferentially around the flat peripheral margin 24. The inner face 22 of end plate 20 is similarly formed with a flat peripheral margin 27, two concentric rings 28a, 28b in the spaces between the circular rings 25a–25c, and a plurality of pins 29 projecting axially from the outer margin 27.

The only significant difference between the two end plates 10 and 20 is that the connector sleeve 13 in end plate 10, serving as the inlet port into the bellows, is dimensioned so as to define a male connector element, whereas connector sleeve 23 in end plate 20, serving as the outlet port from the bellows, is dimensioned so as to define a female connector element. Thus, the outer diameter of connector sleeve 13 is substantially equal to the inner diameter of connector sleeve 23 so that a plurality of such bellows may be stacked in tandem, if desired, as will be described more particularly below.

Figure 7:
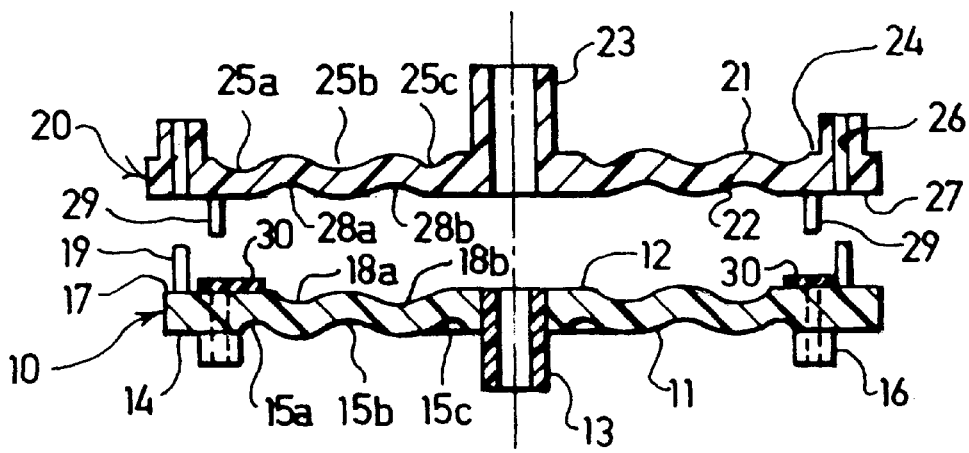
FIG. 7 is an enlarged sectional view more particularly illustrating the construction of the bellows of FIGS. 3–6.

The bellows illustrated in FIG. 7 further includes a resilient sealing ring 30 interposed between the flat confronting margins 17, 27 of the two end plates 10, 20. The two end plates are assembled together by force-fitting the pins 19, 29 of each end plate into the sockets 16, 26 of the other end plate.

When the two end plates are thus assembled together, their confronting inner faces 12, 22 define a chamber which is sealed around the periphery by sealing ring 30. It will also be seen that the concentric circular recesses in the inner faces of the two end plates are aligned with each other to define circular passages for the water inletted into the bellows.

Figure 4:
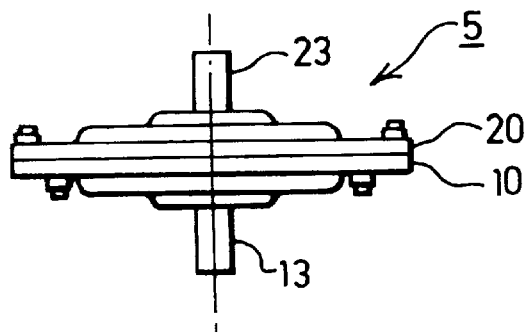
Figure 5:
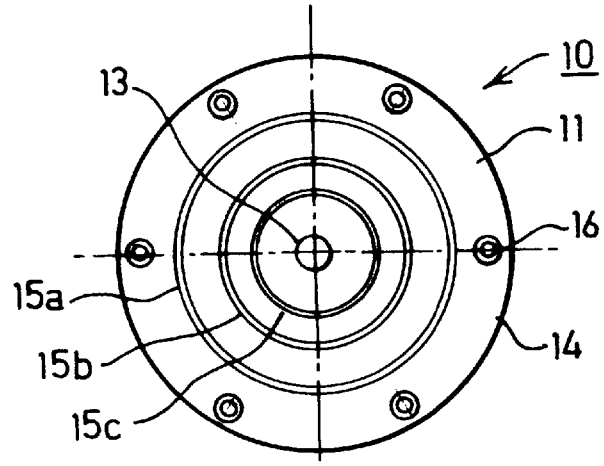
FIGS. 5 and 6 are plan views illustrating the outer face and inner face, respectively, of one of the end plates in the bellows of FIGS. 3 and 4.
Figure 6:
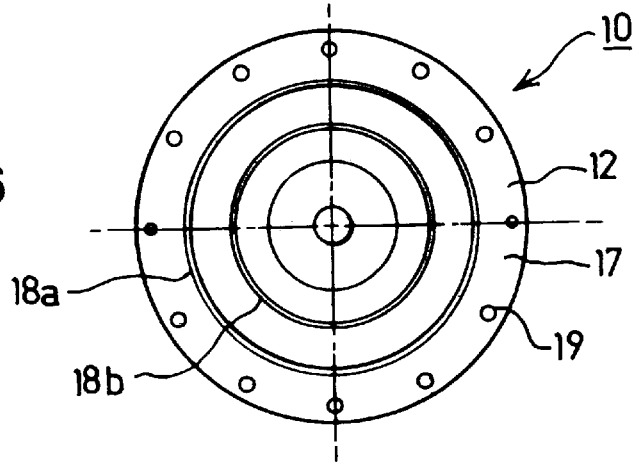

Although the two end plates 10, 20 of the bellows are made of substantially rigid material, the above-described arrangement of recesses on the inner and outer faces of the two end plates permits their center regions to be displaced outwardly, and thereby to expand the chamber defined by them as the pressure within the chamber increases. FIGS. 2 and 4 illustrate this condition wherein the pressure of the water within the bellows has been increased such as to displace outwardly the center regions of the two end plates 10, 20.

The pulsator apparatus illustrated in the drawings thus operates substantially as described in U.S. Pat. No. 4,781,217, wherein bellows 5 serves as the expansible chamber. Thus, the water is inletted via inlet 3 at a continuous slow flow rate because of the flow reducer device 4. Since the valve assembly 6 is in its normally closed condition, the pressure within the bellows gradually builds up, thereby expanding its chmaber by the displacement of the center regions of the two end plates 10, 20 as shown in FIGS. 2 and 4. When the pressure reaches the predetermined value as preset by valve assembly 6, the valve automatically opens, thereby producing a pulse of water to the sprinkler 2, which discharges the water around the sprinkler. The pressure within bellows 5 thus drops, and when it drops to a predetermined low value, as also preset by valve assembly 6, the valve automatically closes, thereby permitting a new build up of pressure within the bellows by the continuous slow flow of water into it via the inlet 3 and the flow reducer 4.

Figure 8:
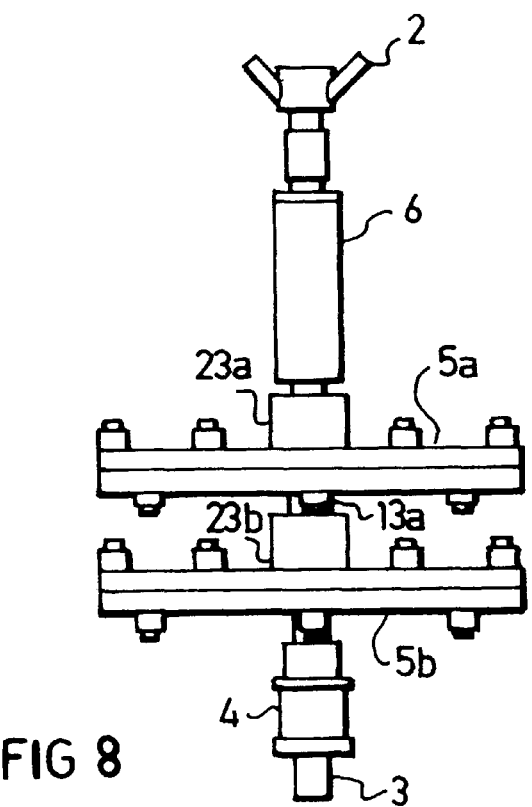
FIG. 8 is a view similar to that of FIG. 1 but showing how a plurality of the bellows may be connected in tandem for any particular application.

FIG. 8 illustrates a variation wherein two (or more) bellows 5 may be assembled in tandem to supply the water pulses to the water sprinkler 2. Thus, as described above, the outlet port 23a of one bellows 5a serves as the female element for receiving the inlet port 13a of the next bellows 5b when assembled in tandem with it.

While the invention has been described with respect to one preferred embodiment, it will be appreciated that many other variations and other applications of the invention may be made. For example, the two end plates 10, 20 can be attached together at their outer peripheries by a welding process, rather than by the use of the pins, sockets and sealed ring. In addition, the described expansible bellows can be used for other applications, e.g., for measuring fluid pressure, or in other types of pulsating devices, e.g., for supplying pulses of air or liquid to a power driving device. Many other variations, modifications and applications of the invention will be apparent.

I claim:

1. An expansible bellows, comprising:

a pair of end plates attached together and sealed around their peripheries such that their inner faces confront each other to define between them a chamber for containing a fluid;

one of said end plates including an inlet port to said chamber;

the other of said end plates including an outlet port from said chamber;

the faces of both said end plates being formed with annular recesses which permit the center portions of the end plates to flex outwardly, and thereby to expand said chamber, when pressurized fluid is inletted into the chamber via said inlet port and blocked from flowing out of said chamber through said outlet port;

each end plate being integrally formed on one face with a plurality of pins spaced circumferentially around its outer periphery, and on the opposite face with a plurality of sockets arranged to receive, with a force-fit, the pins of the other end plate in order to permit the two end plates to be held together at their outer peripheries by said force fit.

2. The bellows according to claim 1, wherein said recesses are in both faces of said end plates and are in the form of a plurality of concentric circles of different diameters so as to be radially spaced from each other.

3. The bellows according to claim 2, wherein the circular recesses in the inner face of each end plate are aligned with the spaces between the circular recesses in the outer face of the respective end plate, and with the circular recesses in the inner face of the other end plate.

4. The bellows according to claim 1, wherein each of said end plates is formed of substantially rigid material and is of circular shape.

5. The bellows according to claim 1, wherein the outer peripheries of the two end plates are sealed by a sealing ring which is interposed between the inner faces of said end plates at their outer peripheries.

6. The bellows according to claim 1, wherein each of said ports includes a tubular connector dimensioned such that one tubular connector serves as a male connector, and the other as a complementary female connector, thereby permitting a plurality of said bellows to be attached together into a stack via said connectors.

7. A pulsator, comprising:

an expansible bellows according to claim 1, a flow reducer device connected to the inlet port of said bellows to produce a continuous slow flow of fluid into the chamber of said bellows;

and a valve assembly connected to said outlet port; said valve assembly being normally closed, automatically opening when the fluid in said chamber has reached a predetermined pressure, and automatically reclosing when the fluid in said chamber has dropped to a second predetermined pressure lower than said first predetermined pressure.

8. The pulsator according to claim 7, wherein there are a plurality of said bellows connected together in tandem with the outlet of one bellows connected to the inlet of the next bellows.

9. The pulsator according to claim 7, further including a water irrigation device connected to the outlet of said valve assembly.

10. A pulsator, comprising:

an expansible bellows including a pair of end plates attached together and sealed around their peripheries such that their inner faces confront each other to define between them a chamber for containing a fluid, one of said end plates including an inlet port to said chamber, the other of said end plates including an outlet port from said chamber, the inner and outer faces of both said end plates being formed with annular recesses which permit the center portions of the end plates to flex outwardly and thereby to expand said chamber when pressurized fluid is inletted into the chamber via said inlet port and blocked from flowing out of said chamber through said outlet port;

a flow reducer device connected to the inlet port of said bellows to produce a continuous slow flow of fluid into the chamber of said bellows;

and a valve assembly connected to said outlet port; said valve assembly being normally closed, automatically opening when the fluid in said chamber has reached a predetermined pressure, and automatically reclosing when the fluid in said chamber has dropped to a second predetermined pressure lower than said first predetermined pressure.

11. The pulsator according to claim 10, wherein said recesses are in both faces of said end plates and are in the form of a plurality of concentric circles of different diameters so as to be radially spaced from each other, the circular recesses in the inner face of each end plate being aligned with the spaces between the circular recesses in the outer face of the respective end plate.

12. The pulsator according to claim 11, wherein the circular recesses in the inner face of each end plate are aligned with the circular recesses in the inner face of the other end plate.

13. The pulsator according to claim 10, wherein each of said end plates is formed of substantially rigid material and is of circular shape.

14. The pulsator according to claim 10, wherein the outer peripheries of the two end plates are sealed by a sealing ring which is interposed between the inner faces of said end plates at their outer peripheries.

15. The pulsator according to claim 10, wherein the pair of end plates are attached together at their outer peripheries by pins integrally formed in the outer periphery of one end plate received with a force-fit within sockets formed in the other end plate.

16. The pulsator according to claim 10, wherein each of said ports includes a tubular connector dimensioned such that one tubular connector serves as a male connector, and the other as a complementary female connector, thereby permitting a plurality of said bellows to be attached together into a stack via said connectors.

17. The pulsator according to claim 10, wherein there are a plurality of said bellows connected together in tandem with the outlet of one bellows connected to the inlet of the next bellows.

18. The pulsator according to claim 10, further including a water irrigation device connected to the outlet of said valve assembly.

19. The pulsator according to claim 10, wherein said flow reducer device is a drip irrigation emitter.

* * * * *